United States Patent Office

3,549,404
Patented Dec. 22, 1970

3,549,404
SEAMLESS MULTI-LAYERED COATING ASSEMBLY AND PROCESS FOR PREPARING SAME
Felix P. Liberti, Totowa Boro, and Nicholas J. Lacamera, North Plainfield, N.J., assignors to National Starch and Chemical Corporation, New York, N.Y., a corporation of Delaware
No Drawing. Filed Apr. 24, 1968, Ser. No. 723,888
Int. Cl. B44c 1/06; B44d 1/14
U.S. Cl. 117—26                                    14 Claims

ABSTRACT OF THE DISCLOSURE

Protective and decorative multi-layered coating systems resulting from the successive application to solid substrates of: (1) an underlayment coating comprising a clear or pigmented aqueous vinyl acetate polymer/polyurethane emulsion blend; (2) a seal coat comprising a clear aqueous vinyl acetate polymer/polyurethane emulsion blend; and, (3) a glaze or wear coat comprising a clear solvent-based polyurethane system. The resulting dried, multi-layered system provides seamless flooring, wall paneling, counter and table tops, and coverings for a wide variety of surfaces.

---

"Monolithic" or "seamless" flooring has been attacting increasingly greater interest for both industrial and consumer uses. The potential for obtaining attractive and unique design variation, excellent wear resistance and durability, and exceptional maintenance economy are a few of the factors responsible for the increase in popularity of this type of flooring.

As the name suggests, monolithic flooring is a single unit flooring system which is applied in situ, i.e. over any existing floor or surface, by means of multiple coating applications with the inclusion therein, if desired, of decorative particles or other visual and decorative effects.

In the past, such monolithic floorings consisted primarily of multiple layers of solvent-based polyurethane or epoxy coatings. The typical procedure for applying these systems involved the steps of: (1) preparing the existing floor as by cleaning and sealing cracks, etc.; (2) applying a primer coat, where the nature of the existing flooring required the same; (3) applying a clear or slightly pigmented solvent-based coating and allowing this underlayment coat to cure and dry; (4) applying a second solvent-based coating; (5) scattering decorative chips in the latter coating; (6) allowing the thus applied seal coat to cure and dry; (7) sanding the surface of the chip-containing seal coat; and (8) applying three or four clear polyurethane topcoats which were then cured and dried.

Needless to say, the latter procedure is a tedious, time-consuming operation with many inherent disadvantages. Thus, the prime disadvantage of these prior art systems is the length of time required to complete their installation; a period of as long as 8–24 hours often being required for a single polyurethane or epoxy coating to cure and dry, while the total installation time may extend over a 48–72 hour period. It is quite apparent that such lengthy installation periods are both uneconomical and inconvenient. Furthermore, it is often required that a primer coat be utilized in conjunction with these prior art systems. Such primers are applied to the substrate prior to the application of the seamless flooring and are needed in order to improve the adhesion of the flooring system to the substrate as well as to prevent "bleed-through" from the substrate. The bleeding phenomenon is especially prevalent with asphalt substrates wherein the organic solvent of the polyurethane and epoxy coatings dissolves the asphalt thereby causing the bleeding and subsequent discoloration of both the decorative chips and the uppermost wear coat.

In addition, the necessary presence of organic solvents in these prior art systems produces solvent and by-product fumes during the curing and drying process which are quite often rather toxic. The lengthy installation period serves to increase this hazard and necessitates that adequate ventilation be provided for substantial periods of time. The presence of the later solvents as well as the curing potential of the polyurethane and epoxy systems also present difficulties with regard to removing these systems from the skin of those individuals with whom they may accidentally make contact as well as from the equipment utilized for their application. The solvent systems utilized in these prior art products also have the undesirable effect of penetrating the decorative chips and thereby curling the edges thereof. The result is the formation of a rough, uneven surface which must be sanded prior to the application of the seal and wear coats.

The complex measuring or mixing of catalysts or other additives at the time of application which is required with the two component prior art systems, e.g. a system comprising isocyanate prepolymer and polyol, is also a time-consuming operation and severely detracts from the interest such systems might ordinarily generate in the "do-it-yourself" consumer market.

Furthermore, there are severe limitations as to the novelty in design and appearance which may be achieved with the prior art flooring systems. The moisture-cured polyurethanes, which are frequently used as the underlayment coat, are necessarily utilized in a clear state inasmuch as they do not readily take to pigmentation and tend to gel upon coming into contact with the moisture present in conventional pigment systems. Thus, it is required that the decorative chips be cast throughout the underlayment coat in order to completely conceal the substrate. In addition, the color and design possibilities are limited solely to the patterns which may be achieved with these decorative chips. This reduced flexibility in design is further aggravated as a result of the tendency for the solvent-based materials that completely surround the chips to effect their discoloration and thus prevent the attainment of the intended design. As a final disadvantage, the prior art systems are prone to exhibit dimensional instability, i.e. they exhibit a tendency to "creep" or shrink away from the edge of a wall, thereby creating unsightly crevices.

It is the prime object of this invention to provide seamless flooring systems which are substantially devoid of the deficiencies inherent in the prior art flooring systems. It is a further object to provide flooring systems which are water-based thereby substantially reducing the difficulties arising from the use of organic solvent-based systems. It is a still further object to provide flooring systems which can be easily and efficiently applied to an unlimited variety of substrates. Various other objects and advantages of this invention will become apparent from the following detailed description thereof.

We have now discovered that by utilizing emulsion-based systems, as hereinafter described, as the underlayment and seal coats in the preparation of seamless flooring we are able to substantially overcome the difficulties which are inherent in the flooring systems utilized heretofore. Thus, our novel flooring systems can be completely installed in approximately six hours inasmuch as the use of water-based systems eliminates the need for long curing and drying times. These flooring systems exhibit excellent adhesion to conventional flooring substrates. There is no involved measuring or mixing of catalysts at the time of application and there is no time limit to the workability of the formulated coatings. The underlayment coating of our novel systems also serves as a primer, thereby obviating the need for separate primer coats in order to prevent the bleed-through and discoloration from asphalt surfaces. Furthermore, the underlayment coating can be readily tinted to any desirable color thereby providing a background which totally conceals the substrate and which, in combination with an open pattern of chips, enhances the overall decorative effect obtainable with monolithic flooring.

Our novel flooring systems also eliminate the need for sanding before the application of the seal coat. Thus, as contrasted with solvent-based systems, the decorative chips which may be utilized in our aqueous emulsion system do not curl at the edges but, rather, lie flat in the underlayment coat to produce a smooth surface. The seal coat further flattens the chips by softening them and depressing any exposed edges. No problems are posed by the utilization of a solvent-based glaze coat inasmuch as excellent inter-coat adhesion is observed between the emulsion-based coatings and the solvent-based glaze coat. Of primary importance is the fact that only water evaporates into the atmosphere during the drying of the emulsion-based coatings. Thus, the potential hazards which may be encountered in the use of solvent systems as well as the need for adequate ventilation which is required due to the presence of solvent fumes are both substantially eliminated with our water-phase systems. Furthermore, these systems may be readily removed from the skin or from any equipment utilized in their application.

The advantages of our emulsion-based systems are also observed after the seamless flooring has been installed. Thus, the excellent solvent resistance of the emulsion coatings prevents the decorative chips from becoming discolored as a result of their making contact with the solvent-based glaze coat. The underlayment and coats exhibit excellent flexibility and dimensional stability. The tendency to shrink away from the edge of a wall is greatly minimized. In addition, the resulting seamless flooring needs no waxing, is stain resistant, wears well and has superior resiliency.

The novel flooring systems of this invention are multilayered assemblies comprising: (1) at least one underlayment coat comprising the dried residue of a clear or pigmented aqueous vinyl acetate polymer/polyurethane resin emulsion blend which is situated in intimate face-to-face contact with the flooring substrate; (2) at least one seal coat comprising the dried residue of a clear aqueous vinyl acetate polymer/polyurethane resin emulsion blend which is applied to the surface of, and is in intimate face-to-face contact with, the previously applied underlayment coat; and (3) at least one glaze or wear coat comprising the cured and dried residue of a solvent-based polyurethane resin system which is in intimate face-to-face contact with the upper surface of the seal coat. Decorative chips may, if desired, be broadcast onto the wet underlayment coat prior to the drying thereof and the subsequent application of the seal coat.

The vinyl acetate polymer/polyurethane resin emulsion system which is the basic component of both the underlayment and the seal coats is merely a physical blend of an aqueous vinyl acetate homo- or copolymer emulsion and an aqueous polyurethane resin emulsion.

Regarding the polymers of vinyl acetate which may be used in these emulsion systems, these may include polyvinyl acetate or copolymers of vinyl acetate with any polymerizable monomer such, for example, as copolymers containing vinyl acetate in combination with: (1) alkyl esters of acrylic and methacrylic acids such as ethyl acrylate, butyl acrylate, octyl acrylate and butyl methacrylate; (2) substituted or unsubstituted mono or dialkyl esters of alpha, beta-unsaturated dicarboxylic acids such as the substituted or unsubstituted mono and dibutyl, mono and dioctyl maleate esters as well as the corresponding fumarates, itaconates and citraconates; (3) alpha, beta-unsaturated carboxylic acids such as crotonic, acrylic, methacrylic, maleic, itaconic, and citraconic acids; (4) hydroxyalkyl esters of alpha, beta-unsaturated carboxylic acids such as hydroxyethyl acrylate and hydroxethyl maleate; (5) vinyl halides such as vinyl chloride; (6) vinylidene halides such as vinylidene chloride; (7) vinyl esters wherein the acid derived radical thereof contains more than one carbon atom, such as vinyl propionate and vinyl butyrate; (8) vinyl esters of alpha-branched saturated aliphatic monocarboxylic acids, such as vinyl pivalate; (9) nitriles of alpha beta-unsaturated carboxylic acids such as acrylonitrile; (10) olefins such as ethylene; and (11) N-alkylol derivatives of amides of alpha, beta-unsaturated carboxylic acids such as N-methylolacrylamide.

In addition to copolymers of vinyl acetate with one of the above described comonomers, it is also possible to use polymers of vinyl acetate wherein the vinyl acetate is copolymerized with any two, or more, of these comonomers. However, in order to retain the solvent resistant properties which are provided by the moieties derived from the vinyl acetate, it is preferred that the total comonomer concentration should not exceed about 50% by weight, of the resulting copolymer.

The vinyl acetate polymer emulsion may be prepared by any of the aqueous emulsion polymerization techniques well known to those skilled in the art. These techniques generally involve the emulsion polymerization of the respective monomers in the presence of a free radical type catalyst. Protective colloids, such as polyvinyl alcohol and hydroxyethyl cellulose, are frequently added to the monomer-water blend prior to polymerization, whereby they act as the primary emulsifier or stabilizer for the monomers in the preparation of the aqueous emulsions. The resulting vinyl acetate polymer emulsions may contain any total solids content which may be desired by the practitioner, although practical total solids content, for purposes of this invention, will usually range from about 30 to 65% by weight.

The polyurethane resin emulsion component of our systems may be prepared by the use of any of the methods known in the art for preparing such aqueous emulsions. Thus, a typical procedure involves reacting an organic compound containing at least two active hydrogen atoms with a stoichiometric excess of an organic diisocyanate and, while the addition product, i.e. the polyurethane prepolymer, is in the form of a syrupy liquid, emulsifying it in water or in an aqueous solution of a chain extending agent. For use in the novel flooring systems of this invention, it is desirable that these polyurethane emulsions have a resin solids content of from about 35 to 70%, by weight.

The organic diisocyanates which may be employed in preparing these polyurethane resin emulsions may be selected from a variety of organic diisocyanates, including aromatic, aliphatic and cycloaliphatic diisocyanates and combinations of any of these types. Representative compounds include: 2,4-tolylene diisocyanate; m-phenylene diisocyanate; 4-chloro-1,3-phenylene diisocyanate; 4,4'-biphenylene diisocyanate; 1,5-naphthylene diisocyanate; 1,4-tetramethylene diisocyanate; 1,6-hexamethylene diisocyanate; 1,10-decamethylene diisocyanate; 1,4-cyclohexylene diisocyanate; 4,4'-methylene-bis-(cyclohexyl isocyanate); 1,5-tetrahydro-naphthylene diisocyanate; xylylene diisocyanate, and the like. The dioscyanate may contain other substitutents, and, in the case of the oromatic diisocyanates, the isocyanate groups may be attached either to the same or to different phenyl rings.

The active hydrogen containing compounds used in such procedures may be chosen from a variety of compounds containing at least two active hydrogen atoms, that is, hydrogen atoms which can be replaced by sodium. Among such compounds that can be used in the emulsification procedure are included: ether glycols, i.e. diols, e.g. the reaction product of propylene oxide and propylene glycol;

ether triols, e.g. the reaction product of propylene oxide and glycerin; esters of polyhydric alcohols, e.g. castor oil which is comprised of 90% triglyceride or ricinoleic acid and 10% triglyceride of the following acids: oleic, stearic and dihydroxystearic; and, polyalkylene esters of alkylene or arylene diacids, e.g. the reaction product of ethylene glycol and adipic acid. Also of use are such active hydrogen containing compounds as hexane triols, butane diols, thiodiethylene glycols, p-xylene-alpha, alpha'-diols, polyesteramide resins, alkd resins with terminal hydroxy or carboxy groups, and similar compounds.

Any emulsifying agent which will yield oil-in-water emulsions is applicable for use in preparing the polyurethane resin emulsions. Representative types include: polyethylene glycol ethers of long chain alcohols; quaternary ammonium salts; the tertiary amine or alkylol amine salts of long chain alkyl acid sulfate esters; alkyl sulfonic acids; alkyl aryl sulfonic acids; polyvinyl alcohol; and, alkali metal salts of high molecular weight organic acids. These emulsifying agents may be added either to the initial reaction product or to the water in which the prepolymer is to be emulsified, or, they may be formed in situ during the addition of the prepolymer to the water.

As previously noted, the vinyl acetate polymer emulsion and the polyurethane resin emulsion are merely thoroughly admixed to a homogeneous state in order to function as the basic component of the underlayment and seal coats. With regard to the relative proportions of each of the emulsions in the final blend, a weight ratio of vinyl acetate polymer emulsion solids: polyurethane resin emulsion solids ranging from about 98:2 to 75:25 is preferred. Furthermore, the total solids contents of the resulting emulsion blends should preferably range from about 45 to 65%, by weight.

Optional additives may be incorporated into these emulsion blends in order to modify certain properties thereof. Among such additives are included: pigment dispersing and wetting agents such as potassium tripolyphosphate and alkylphenoxy-polyoxyethylene ethanol; pigments such as titanium dioxide, zinc oxide, titanium-barium pigment, yellow iron oxide and chromium oxide green; pigment extenders such as talc, clay, silica, calcium carbonate, magnesium silicates and mica; viscosity control reagents such as hydroxyethyl cellulose; freeze/thaw additives such as ethylene glycol; film fusion agents such as hexylene glycol and ethylene glycol monoethyl ether acetate; plasticizers such as dibutyl phthalate; preservatives; and, defoamers, etc. It should be noted that since clear seal coats are typically utilized in our novel flooring systems, the pigments and pigment extenders will primarily be utilized in conjunction with the underlayment coats. Needless to say, the amount of pigment utilized will depend on the desired intensity of coloration as well as on the need for concealing the pre-existing floor surface.

The decorative chips which may, if desired, be utilized to implement the design present on the seamless flooring are preferably prepared from vinyl acetate copolymers such, for example, as vinyl acetate/acrylate ester copolymers. It is desirable that these chips be flexible and exhibit satisfactory water and solvent resistance. In the novel process of this invention, the chips are broadcast or scattered into the wet underlayment coat in any desired pattern and color combination. As previously noted, these chips lie flat in the underlyment coat and do not require sanding prior to the application of the seal coat.

The surface glaze or wear coat, which is the exposed surface of the seamless flooring system, may be a coating selected from among any of the conventional wear coat compositions such, for example, as the moisture-curable polyurethane; organic solvent solution of polyacrylate and polymethacrylate esters resins, e.g. a butyl methacrylate/methyl methacrylate copolymer and a methyl methacrylate/ethyl copolymer; and, amine cured epoxy resins, i.e. the resin obtained by the condensation of epichlorohydrin with p,p'-isopropylidenediphenol which are then cured with an amine such as diethylene triamine, triethylenetetramine and diethylaminopropylene. The moisture-curable polyurethanes are preferred for use as the wear coat and they typically constitute an organic solvent system containing an aromatic diisocyanate, such as tolylene diisocyanate, or an aliphatic diisocyanate in combination with a polyether, the resultng system polymerizing upon exposure to moisture.

With regard to the actual application of the emulsion coatings of our novel flooring system, the underlayment coating can be applied with a paint roller, brush, trowel or any other conventional applicator over almost any solid flooring substrate including, for example, asphalt, vinyl asbestos, rubber tile, cement, plywood, and linoleum, etc. The underlayment coating will usually be applied in a coating thickness ranging from about 3 to 10 mils and will typically take no longer than about one to two hours to dry at ambient temperatures.

The clear, emulsion-based seal coat is then applied over the dry underlayment coating by means of any of the above described applicators. The seal coat will usually be applied in a coating thickness ranging from about 0.5 to 1.5 mils and will also dry in a matter of about one to two hours at ambient temperatures.

Thereafter, the preparation of our novel seamless flooring is completed by applying at least one glaze or wear coat, as previously described, over the dry seal coat. The wear coats are usually applied in a coating thickness of from about 3 to 30 mils and require about 12 hours to completely cure and dry at ambient temperatures so as to provide a hard, wear resistant surface.

Although great emphasis has been placed, in this disclosure, on the use of our novel multi-layered systems for the preparation of seamless floors, it should be noted that these systems may also be effectively utilized as counter tops, bar tops, walls, wall paneling, and table tops, etc. Furthermore, where the desired application does not require a rard, wear resistant outer surface, e.g. wall paneling, the glaze or wear coat may be eliminated from the system and, if desired, an additional seal coat may be substituted therefor.

It should be noted also that the individual coatings derived from the vinyl acetate polymer/polyurethane resin emulsions of this invention may be utilized in conjunction with prior art coatings to produce flooring assemblies wherein the spatial relationship of the layers in our novel systems is varied. Thus, for example, the underlayment coating of our systems may be utilized as a middle layer in flooring assemblies wherein an epoxy anchor base is the coating which is in intimate contact with the pre-existing floor substrate. Furthermore, our emulsion coatings may be utilized in combination with acrylic emulsions or additional solvent-based systems in order to provide flooring assemblies of varying composition and configuration.

The following examples will further illustrate the embodiment of this invention. In these examples all parts given are by weight unless otherwise noted.

EXAMPLE I

This example illustrates the preparation of a typical seamless flooring system of this invention.

The polyvinyl acetate/polyurethane resin aqueous emulsion blend which was the basic component of both the underlayment and seal coats was prepared by thoroughly admixing: (a) 950 parts of aqueous polyvinyl acetate emulsion which had been prepared utilizing polyvinyl alcohol as the protective colloid therein and which had an intrinsic viscosity, as determined in acetone at 30° C., to 1.8 and a total solids content of 55%, by weight; with (b) 50 parts of an aqueous polyurethane resin emulsion prepared by immersing, in an aqueous solution as polyvinyl alcohol which also contained caster oil therein, a prepolymer comprising the reaction product of polypropylene glycol having an average molecular weight of 1000 with 3 moles of 2,4-tolylene diisocyanate, the resulting emulsion having a total solids content of 48%, by weight.

Thereafter, the resulting polyvinyl acetate/polyurethane resin emulsion blend was formulated into the following underlayment and seal coat compositions.

Pigmented underlayment coat [1] (51%, by weight, total solids content):

|     |     | Parts |
| --- | --- | --- |
| (1) | Water | 100.0 |
| (2) | Potassium tripolyphosphate [2] | 1.0 |
| (3) | Sodium salt of a carboxylated polyelectrolyte [2] | 4.0 |
| (4) | Alkyl-phenoxy-polyoxyethylene ethanol [2] | 4.0 |
| (5) | Phenyl mercuric acetate (preservative) | 0.5 |
| (6) | Titanium dioxide (hiding pigment) | 50.0 |
| (7) | Silica (reenforcing pigment) | 50.0 |
| (8) | 1.5% by weight, aqueous hydroxyethyl cellulose solution (viscosity control reagent) | 100.0 |
| (9) | Powdered talc (reenforcing pigment) | 200.0 |
| (10) | Ethylene glycol (freeze/thaw additive) | 25.0 |
| (11) | Hexylene glycol (film fusion agent) | 15.0 |
| (12) | Tall oil fatty acids (defoamer) | 1.0 |
| (13) | Aqueous polyvinyl acetate/polyurethane emulsion blend (as described above) | 400.0 |
| (14) | Dibutyl phthalate (plasticizer) | 15.0 |
| (15) | 1.5%, by weight, aqueous hydroxyethyl cellulose solution | 100.0 |

Clear seal coat [3] (30%, by weight, total solids content):

|     |     | |
| --- | --- | --- |
| (1) | Aqueous polyvinyl acetate/polyurethane resin emulsion blend (as described hereinabove) | 480.0 |
| (2) | Water | 100.0 |
| (3) | Phenyl mercuric acetate (preservative) | 0.5 |
| (4) | 1.5%, by weight, aqueous hydroxyethyl cellulose solution (viscosity control reagent) | 245.0 |
| (5) | Ethylene glycol monoethyl ether acetate (film fusion agent) | 30.0 |
| (6) | Ethylene glycol (freeze/thaw additive) | 25.0 |

[1] Ingredients (1–12) were thoroughly dispersed whereupon ingredients (13–15) were slowly admixed therewith to complete the preparation.
[2] Pigment dispersing and wetting agents.
[3] Ingredients (2), (3) and (4) were premixed and then thoroughly blended with the other ingredients in order to prepare the seal coat composition.

Furthermore, the decorative chips that were utilized to implement the design in the flooring were based on a pigmented aqueous emulsion of a 75:25 vinyl acetate: butyl acrylate copolymer which had a total solids content of 79%, by weight; the latter emulsion being cast into films, by means of a knife coating procedure, which were then dried and comminuted in order to provide the appropriately sized decorative chips.

In the actual application of the seamless flooring of this example, an asphalt-tiled floor was first thoroughly cleaned so as to remove all foreign matter therefrom. The pigmented underlayment coat, described hereinabove, was then applied by means of a paint roller at a coverage level of one gallon per each 250 square feet of substrate. While the underlayment coat was still wet, the above described decorative chips were scattered therein so as to form the desired design pattern. The underlayment coat was then allowed to dry for a period of one to two hours at a temperature of 72° F.

Thereafter, the clear seal coat, as described hereinabove, was applied to the smooth surface of the underlayment coat by means of a conventional paint roller at a coverage level of about one gallon per each 500 square feet. Upon drying for a period of one to two hours at a temperature of 72° F., the seal coat was covered with a clear wear coat consisting of a moisture-curable polyurethane resin in a predominantly xylene solvent; the latter polyurethane resin resulting from the moisture initiated polymerization of 2,4-tolylene diisocyanate and the reaction product of trimethylol propane and propylene glycol. The wear coat was applied at a coverage level of one gallon per each 400 square feet and required approximately 12 hours to cure and dry to a hard, wear resistant surface.

The resulting seamless flooring was both functional and decorative. It adhered well to the asphalt substrate and exhibited excellent dimensional stability. There was no trace of discoloration as a result of any asphalt bleed-through nor were the chips effected by the solvent-based wear-coat.

The above described procedure was then repeated with the sole exception, in this instance, that: (1) a 85:15 vinyl acetate:ethyl acrylate copolymer; (2) a 75:25 vinyl acetate:dibutyl maleate copolymer; and (3) a 65:35 vinyl acetate:vinyl ester of a nine carbon atom alpha-branched saturated aliphatic monocarboxylic acid copolymer, were each, respectively, substituted for the polyvinyl acetate in the basic vinyl acetate polymer/polyurethane resin emulsion blend, while: (1) a polyurethane prepolymer comprising the reaction product of an ether triol resulting from the reaction of 1,2,6-hexane triol and propylene oxide with three moles of methylene-bis (4-phenyl isocyanate); and (2) a polyurethane prepolymer comprising the reaction product of castor oil with three moles of hexamethylene diisocyanate, were each, respectively, substituted for the polyurethane resin in the basic vinyl acetate polymer/polyurethane resin emulsion blend. In all instances, the properties of the resulting seamless floors were comparable to those of the seamless floor whose preparation was described hereinabove.

EXAMPLE II

This example illustrates the improved characteristics exhibited by the aqueous vinyl acetate polymer/polyurethane resin emulsion blends designated for use in the novel seamless flooring systems of this invention.

The emulsion systems utilized in this example were prepared by substituting each of the vinyl acetate polymer/polyurethane resin emulsion blends described in the following table into the underlayment coating formulation set forth in Example I, hereinabove.

| | Parts | | | | | |
| --- | --- | --- | --- | --- | --- | --- |
| | Formulation No. | | | | | |
| | 1 | 2 | 3 | 4 | 5 | 6 |
| An aqueous emulsion of a polyvinyl alcohol stabilized polyvinyl acetate (as described in Example I) | 98 | 95 | 92 | 85 | 75 | |
| An aqueous emulsion of a hydroxyethyl cellulose stabilized polyvinyl acetate | | | | | | 95 |
| An aqueous polyurethane resin emulsion (as described in Example I) | 2 | 5 | 8 | 15 | 25 | 5 |

In order to determine the applicability of the resulting emulsion systems for use in the preparation of seamless flooring, they were submitted to the following test procedures. The test samples for each of these tests were prepared by casting, by means of a Bird applicator, the specified emulsion systems onto the desired substrates and then drying the resultant films at 72° F. for a period of about 16–20 hours to a dry film thickness of 3 mils.

*Adhesion.*—This test procedure involved utilizing a thumb nail to "pick" at the dry emulsion films in order to effect their removal from the substrate. Comparative adhesion properties were indicated by the degree of difficulty encountered in effecting such delamination.

*Asphalt bleed resistance (method A).*—In this procedure, the pigmented emulsion films were cast onto asphalt tiles. Thereafter, three drops of xylene were placed on the upper surface of the film and allowed to evaporate. An additional three drops were then placed on the identical spot and also allowed to evaporate. Observations were made as to the extent of asphalt bleed-through caused by the solvent; the latter phenomenon being evidenced by the appearance of brown discoloration in the film. Needless to say, excellent bleed-through resistance is indicated by a minimal amount of discoloration.

(*Method B*).—In this procedure, the emulsion coated asphalt tiles were further coated with a 3 mil film of the clear, solvent-based moisture-curable polyurethane wear coat described in Example I. After a period of 24 hours, the emulsion films were inspected for the brown discoloration which is characteristic of asphalt bleeding.

*Solvent resistance.*—In this instance, glass plates were utilized as the substrate for the emulsion films. Three drops of xylene were placed on the film and allowed to evaporate. Excellent solvent resistance was indicated by the absence of tackiness and deterioration on the part of the treated films.

in intimate face-to-face contact with the upper surface of said underlayment coating; and, (3) at least one wear coat comprising the cured and dried residue of an organic solvent-based resin composition, said wear coat being in intimate face-to-face contact with the upper surface of said seal coat; the resin composition comprising said wear coat being selected from the group consisting of moisture-cured polyurethane resins, polyacrylate ester resins, polymethacrylate ester resins and amine-cured epoxy resins, wherein the weight ratio of vinyl acetate polymer emulsion solids to polyurethane resin emulsion solids in said emulsion blend ranges from about 98:2 to 75:25.

5. The multi-layered coating assembly of claim 4,

| Property | Performance by Formulation No. | | | | | |
|---|---|---|---|---|---|---|
| | 1 | 2 | 3 | 4 | 5 | 6 |
| Adhesion to asphalt tile | Very good | Excellent | Excellent | Excellent | Excellent | Very good |
| Adhesion to glass plate | Fair | do | Fair | Fair | Fair | Good |
| Asphalt bleed resistance (Method A) | Excellent | do | Excellent | Excellent | Excellent | Excellent |
| Asphalt bleed resistance (Method B) | do | do | do | do | do | Do. |
| Asphalt bleed resistance (Method B)* | do | do | do | do | do | Very good |
| Solvent resistance | do | do | do | do | do | Excellent |

*In this procedure, the various emulsion films were coated on asphalt saturated felt sheets as opposed to asphalt tiles.

The result summarized hereinabove clearly indicate the excellent performance exhibited by our designated vinyl acetate polymer/polyurethane resin emulsion blends with regard to the characteristics which are critical to a functional seamless flooring system.

Summarizing, it is thus seen that this invention provides the practitioner with novel seamless flooring systems which are both functional and decorative.

Variations may be made in procedures, proportions and materials without departing from the scope of this invention which is defined by the following claims.

We claim:
1. A seamless multi-layered coating assembly comprising a substrate having at least one layer thereon which comprises the dried residue of an aqueous vinyl acetate polymer/polyurethane resin emulsion blend, wherein the weight ratio of vinyl acetate polymer emulsion solids to polyurethane resin emulsion solids in said emulsion blend ranges from about 98:2 to 75:25.

2. The multi-layered coating assembly of claim 1, wherein said vinyl acetate polymer in said emulsion blend is selected from the group consisting of polyvinyl acetate and copolymers of vinyl acetate containing a minimum of about 50%, by weight, of vinyl acetate with at least one polymerizable monomer selected from the group consisting of alkyl esters of acrylic acid; alkyl esters of methacrylic acid; mono-alkyl esters of alpha, beta-unsaturated dicarboxylic acids; dialkyl esters of alpha, beta-unsaturated dicarboxylic acid; alpha, beta-unsaturated carboxylic acids; hydroxyalkyl esters of alpha, beta-unsaturated carboxylic acids; vinyl halides; vinylidene halides; vinyl esters wherein the acid derived radical thereof contains more than one carbon atom; vinyl esters of alpha-branched saturated aliphatic monocarboxylic acids; nitriles of alpha, beta-unsaturated carboxylic acids; olefins; and, N-alkylol derivatives of amides of alpha, beta-unsaturated carboxylic acids.

3. The multi-layered coating assembly of claim 1, wherein said polyurethane resin in said emulsion blend comprises the reaction product of an organic compound containing at least two active hydrogen atoms with a stoichiometric excess of an organic diisocyanate.

4. A seamless multi-layered coating assembly comprising a solid substrate coated successively with: (1) at least one underlayment coating comprising the dried residue of an aqueous vinyl acetate polymer/polyurethane resin emulsion blend, said underlayment coating being in intimate face-to-face contact with the exposed surface of said substrate; (2) at least one seal coat comprising the dried residue of an aqueous vinyl acetate polymer/polyurethane resin emulsion blend, said seal coat being wherein said vinyl acetate polymer in said emulsion blend is selected from the group consisting of polyvinyl acetate and copolymers of vinyl acetate containing a minimum of about 50% by weight, of vinyl acetate with at least one polymerizable monomer selected from the group consisting of alkyl esters of acrylic acid; alkyl esters of methacrylic acid; mono-alkyl esters of alpha, beta-unsaturated dicarboxylic acids; dialkyl esters of alpha, beta-unsaturated dicarboxylic acids; alpha, beta-unsaturated carboxylic acids; hydroxyalkyl esters of alpha, beta-unsaturated carboxylic acids; vinyl halides; vinylidene halides; vinyl esters where the acid derived radical thereof contains more than one carbon atom; vinyl esters of alpha-branched saturated aliphatic mono-carboxylic acids; nitriles of alpha, beta-unsaturated carboxylic acids; olefins; and, N-alkylol derivatives of amides of alpha, beta-unsaturated carboxylic acids.

6. The multi-layered coating assembly of claim 4, wherein said polyurethane resin in said emulsion blend comprises the reaction product of an organic compound containing at least two active hydrogen atoms with a stoichiometric excess of an organic diisocyanate.

7. The multi-layered coating assembly of claim 4, wherein said solid substrate is an asphalt-containing composition.

8. The multi-layered coating assembly of claim 4, wherein decorative chips are randomly distributed throughout said underlayment coating.

9. A process for preparing a seamless multi-layered coating assembly which comprises the steps of: (1) applying to a solid substrate at least one underlayment coating comprising an aqueous vinyl acetate polymer/polyurethane resin emulsion blend and allowing said coating to dry; (2) and applying to the dry, upper surface of said underlayment coating at least one seal coat comprising an aqueous vinyl acetate polymer/polyurethane resin emulsion blend and allowing said coating to dry, wherein the weight ratio of vinyl acetate polymer emulsion solids to polyurethane resin emulsion solids in said emulsion blend ranges from about 98:2 to 75:25.

10. The process of claim 9 in which there is applied to the dry, upper surface of said seal coat at least one wear coat comprising an organic solvent-based resin composition, said resin composition being selected from the group consisting of moisture-curable polyurethane resins, polyacrylate ester resins, polymethacrylate resins and amine-cured epoxy resins; and allowing said wear coat to cure and dry.

11. The process of claim 9, wherein said vinyl acetate polymer in said emulsion blend is selected from the group consisting of polyvinyl acetate and copolymers of vinyl acetate containing a minimum of about 50%, by weight, of vinyl acetate with at least one polymerizable monomer selected from the group consisting of alkyl esters of acrylic acid; alkyl esters of methacrylic acid; mono-alkyl esters of alpha,beta-unsaturated dicarboxylic acids; dialkyl esters of alpha,beta - unsaturated dicarboxylic acids; alpha,beta - unsaturated carboxylic acids; hydroxyalkyl esters of alpha,beta-unsaturated carboxylic acids; vinyl halides; vinylidene halides; vinyl esters wherein the acid derived radical thereof contains more than one carbon atom; vinyl esters of alpha-branched saturated aliphatic monocarboxylic acids; nitriles of alpha,beta-unsaturated carboxylic acids; olefins; and, N-alkylol derivatives of amides of alpha,beta - unsaturated carboxylic acids.

12. The process of claim 9, wherein said polyurethane resin in said emulsion blend comprises the reaction product of an organic compound containing at least two active hydrogen atoms with a stoichiometric excess of an organic diisocyanate.

13. The process of claim 9, wherein said solid substrate is an asphalt-containing composition.

14. The process of claim 9, wherein decorative chips are randomly distributed throughout said underlayment coating prior to the drying thereof.

References Cited

UNITED STATES PATENTS

| | | | |
|---|---|---|---|
| 2,734,831 | 2/1956 | Larsson | 117—72X |
| 2,891,876 | 6/1959 | Brown et al. | 117—72 |
| 3,446,644 | 5/1969 | Murphy | 117—26X |

WILLIAM D. MARTIN, Primary Examiner

R. HUSACK, Assistant Examiner

U.S. Cl. X.R.

117—29, 72, 76, 123, 139, 148, 161; 260—29.6, 858